United States Patent [19]

Givens

[11] Patent Number: 5,143,776

[45] Date of Patent: Sep. 1, 1992

[54] TISSUE LAMINATES HAVING ADHESIVELY JOINED TISSUE LAMINAE

[75] Inventor: Edward J. Givens, Cincinnati, Ohio

[73] Assignee: The Procter & Gamble Company, Cincinnati, Ohio

[21] Appl. No.: 719,428

[22] Filed: Jun. 24, 1991

[51] Int. Cl.$^5$ .................................................. B32B 9/00
[52] U.S. Cl. ........................................ 428/194; 428/43; 428/198; 428/219; 604/386
[58] Field of Search ............... 428/198, 537.5, 220, 428/219, 195, 43; 156/291, 164; 604/386

[56] References Cited

U.S. PATENT DOCUMENTS

| | | | |
|---|---|---|---|
| 3,672,949 | 6/1972 | Brown | 428/198 |
| 3,672,950 | 6/1972 | Murphy et al. | 161/129 |
| 3,825,379 | 7/1974 | Lohkamp et al. | 425/72 |
| 3,825,380 | 7/1974 | Harding et al. | 425/72 |
| 3,837,995 | 9/1974 | Floden et al. | 428/296 |
| 3,849,241 | 11/1974 | Butin et al. | 161/169 |
| 3,878,014 | 4/1975 | Melead | 156/167 |
| 3,945,873 | 3/1976 | Osborn | 156/271 |
| 3,978,185 | 8/1976 | Butin et al. | 264/93 |
| 4,069,822 | 1/1978 | Buell | 128/294 |
| 4,147,580 | 4/1979 | Buell | 156/291 |
| 4,292,366 | 9/1981 | Fulton | 428/293 |
| 4,300,981 | 11/1981 | Carstens | 162/109 |
| 4,304,625 | 12/1981 | Grube et al. | 162/111 |
| 4,392,861 | 2/1983 | Butterworth et al. | 428/198 |
| 4,487,796 | 12/1984 | Lloyd et al. | 428/154 |
| 4,489,118 | 12/1984 | Endres et al. | 428/154 |
| 4,522,863 | 6/1985 | Keck et al. | 428/196 |
| 4,627,847 | 12/1986 | Puletti et al. | 604/366 |
| 4,652,390 | 3/1987 | Strampach et al. | 252/92 |
| 4,735,738 | 4/1988 | Williams | 252/90 |
| 4,735,846 | 4/1988 | Larsonneur | 428/198 |
| 4,769,279 | 9/1988 | Graham | 428/296 |
| 4,770,920 | 9/1988 | Larsonneur | 428/198 |
| 4,804,577 | 2/1989 | Hazelton et al. | 428/224 |
| 4,816,320 | 3/1989 | St. Cyr | 428/198 |
| 4,817,788 | 4/1989 | Bedenk et al. | 206/0.5 |
| 4,818,463 | 4/1989 | Buehning | 264/40.1 |
| 4,837,199 | 6/1989 | Morishita et al. | 503/227 |
| 4,865,908 | 9/1989 | Liu et al. | 428/248 |
| 4,885,202 | 12/1989 | Lloyd et al. | 428/171 |
| 4,889,476 | 12/1989 | Buehning | 425/72.2 |
| 4,891,249 | 1/1990 | McIntyre | 427/421 |
| 4,894,277 | 1/1990 | Akasaki | 428/198 |
| 4,996,091 | 2/1991 | McIntyre | 428/113 |

FOREIGN PATENT DOCUMENTS

3346928A2 12/1989 European Pat. Off. .

Primary Examiner—Patrick J. Ryan
Assistant Examiner—W. Krynski
Attorney, Agent, or Firm—Larry L. Huston; Fredrick H. Braun; Richard C. Witte

[57] ABSTRACT

Disclosed is a dual laminae tissue laminate having the laminae adhesively joined. The laminae are joined by a water dispersible, and preferably water soluble, hot melt adhesive. The adhesive is applied to one of the laminae in a longitudinally oriented stripe. The stripe is deposited either in a spiral pattern or, preferably, in a melt blown pattern. This stripe provides the advantage that softness is not compromised and that the tissue laminate may be easily disposed, without concern that the adhesive, or the laminate, will not break down in the presence of water.

10 Claims, 1 Drawing Sheet

TISSUE LAMINATES HAVING ADHESIVELY JOINED TISSUE LAMINAE

FIELD OF THE INVENTION

The present invention relates to tissue paper, more particularly to dual laminae tissue paper and more particularly to adhesively joined dual laminae tissue paper.

BACKGROUND OF THE INVENTION

Tissue products are in almost constant use in daily life. Toilet tissue, facial tissue, and paper towels are examples of tissue products used throughout home and industry.

Tissue products are often made of a single lamina. However, a single lamina tissue product has several drawbacks. For example, a single lamina tissue product will be stiffer than a dual laminae tissue product having the same total basis weight. This increased stiffness results in a consumer perception that the single lamina tissue product is not as soft as the dual laminae tissue product and may, therefore, be less preferred than the dual laminae tissue product.

Furthermore, a dual laminae tissue product having the same total basis weight as a single lamina tissue product can be made to have greater caliper. This increased caliper results in the consumer perception the product has thickness and high quality.

However, dual laminae tissue laminates are subject to the phenomenon of skinning. Skinning occurs when the laminae separate from one another and no longer remain intact to form a unitary laminate.

Skinning may, for example, occur when trying to reduce tissue product packaging and transportation costs. For example, U.S. Pat. No. 4,886,167 issued Dec. 12, 1989 to Dearwester discloses packages of toilet tissue and paper towels compressed orthogonal to the cores to reduce the core volume. This compression of the tissue product may impart shear forces to the laminae and result in skinning.

Several attempts have been made in the art to join the dual laminae in a manner to reduce or minimize skinning. Such attempts have been further complicated by the addition of emollient or lotions to the tissue laminae. For example, U.S. Pat. Nos. 4,481,243 issued Nov. 6, 1984 to Allen and 4,513,051 issued Apr. 23, 1985 to Lavash teach multiple laminae of tissue paper joined by a laminating process. The process embosses the laminae together, but requires the embossed region of the tissue to be free of the emollient. This zone coating of the emollient introduces another variable which must be accounted for during the manufacturing process. Furthermore, such lamination has resulted in a perceived loss of softness of the tissue laminate, contrary to one of the principal reasons for utilizing a dual laminae tissue laminate.

Other attempts to join cellulosic tissue laminae include U.S. Pat. No. 4,770,920 issued Sep. 13, 1988 to Larsonneur. Larsonneur teaches laminae bonded at a pair of juncture lines. The pair of juncture lines include individual pressure spot bonds. The spots bond are formed by the use of thermoplastic low viscosity liquid such as melted wax, paraffin, hot melt adhesive or the like and prevent delamination when the laminae become wet.

The Larsonneur teaching suffers from the drawbacks that multiple lines of spots bond joining the laminae reduces the softness of the laminae. Furthermore, given current environmental concerns, the tissue laminate should preferably break down upon wetting, as, for example, occurs when toilet tissue is disposed of in a sewer system.

Another attempt to produce a dual laminae tissue laminate is illustrated in U.S. Pat. No. 4,885,202 issued Dec. 5, 1989 to Lloyd, et al. Lloyd, et al. teaches a high-strength tissue product having two outer tissue laminae thermally bonded to a central lamina of melt blown fibers. The central lamina consists of polypropylene melt blown fibers and has a basis weight of about ten to fifteen grams per square meter. The central lamina overall thermally bonds the outer tissue laminae together to form a unitary composite structure.

Lloyd, et al. has several drawbacks. The polypropylene central lamina develops good wet strength at the expense of the aforementioned disposability characteristics, desirable for environmental reasons. Further, the overall bonding of the outer laminae to the central lamina decreases softness and requires a significant quantity of the melt blown fibers to be added. And further, adding such a significant quantity of melt blown fibers to the laminate increases the manufacturing costs.

U.S. Pat. No. 4,806,418 issued Feb. 2, 1989 to Sigl teaches joining of lotioned tissue to an overall dusting with nonwater dispersible thermoplastic particles. However, this teaching suffers from the same drawbacks as Lloyd et al.

Also, several attempts have been made in the art to provide an apparatus suitable for adhesively joining two laminae in face-to-face relation. Adhesive Joining of laminae may be accomplished by one of two methods, depositing the adhesive onto the face of one lamina in a spiral pattern, or by meltblowing the adhesive onto the face of one lamina in a random pattern.

For example, U.S. Pat. Nos. 3,911,173 issued Oct. 7, 1975 to Sprague, Jr., U.S. Pat. No. 4,031,854 issued Jun. 28, 1977 to Sprague, Jr. and U.S. Pat. No. 4,098,632 issued Jul. 4, 1978 to Sprague, Jr. teach a spiral adhesive deposition nozzle. These nozzles utilize a circumferentially oriented plurality of air jets to induce a spiral pattern to the filament of adhesive as it is discharged from the nozzle and extrudes to the face of the lamina to be adhesively joined.

U.S. Pat. No. 4,949,668 issued Aug. 21, 1990 to Heindel, et al. discloses an apparatus for depositing hot melt adhesive onto a substrate in a semi-cycloidal pattern. The semi-cycloidal pattern closely controls the cross-directional positioning of the adhesive filament to reduce overspray and waste.

U.S. Pat. Nos. 4,891,249 issued Jan. 2, 1990 to McIntyre and U.S. Pat. No. 4,996,091 issued Feb. 26, 1991 to McIntyre disclose an apparatus and process for generating fluid fiber adhesive droplets and combinations of fibers and droplets. The fibers, droplets and combinations thereof are generated by funneling a cone of pressurized air symmetrically about the adhesive filament. This results in a pattern of randomly laid criss-crossing fiber deposits onto the face of the lamina to be joined.

Clearly a need exists to combine the aforementioned adhesive joining technology with dual laminae tissue to produce a dual laminae tissue laminate which minimizes skinning, but without sacrificing other desired properties such as softness and environmentally facile disposability. Therefore, it is an object of this invention to produce a dual laminae tissue laminate having the laminae adhesively joined in a fashion which does not diminish either softness nor disposability. Further, it is an object of the invention to produce such a tissue laminate which minimizes the use of adhesives, so that manufacturing costs can be controlled.

BRIEF SUMMARY OF THE INVENTION

The claimed invention comprises a dual laminae tissue laminate. The laminae are adhesively Joined by a longitudinally oriented stripe of adhesive, preferably transversely centered between the borders of the tissue laminate. The pattern comprises a water-dispersible, adhesive and may be melt blown or spiral.

BRIEF DESCRIPTION OF THE DRAWINGS

While the specification concludes with claims particularly pointing out and distinctly claiming the subject matter of the present invention, it is believed the same will be better understood from the following description taken in conjunction with the associated drawings, in which like components are given the same reference numeral and:

DETAILED DESCRIPTION OF THE INVENTION

Figure 1:
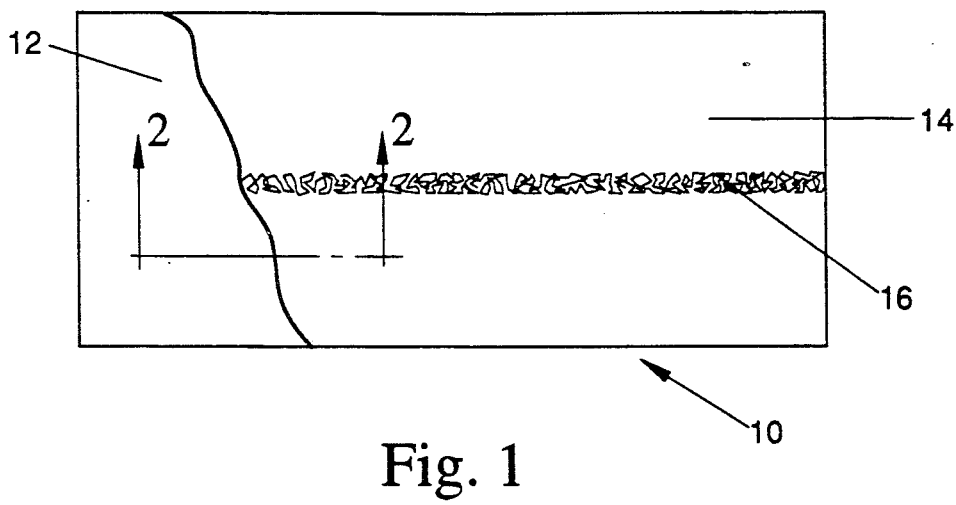
FIG. 1 is a top plan view, shown partially in cutaway, of a tissue laminate according to the present invention.

The tissue product according to the present invention is a laminate 10 and fibrous, macroscopically two-dimensional and planar, although not necessarily flat. Referring to FIG. 1, a tissue product laminate 10 according to the present invention does have some thickness in the third dimension. However, the thickness in the third dimension is relatively small compared to the dimensions of the plane of the tissue product laminate 10.

More particularly, the tissue laminate 10 comprises two laminae 12 and 14 joined in face-to-face relation to form a unitary laminate 10. The laminae 12 and 14 are joined by a stripe of adhesive 16, which is interposed between the laminae 12 and 14 and contacts the inwardly oriented face of each laminae 12 and 14.

The laminae 12 and 14 are cellulosic and composed of fibers approximated by linear elements. The fibers have one very large dimension (along the longitudinal access of the fiber) compared to the other two relatively small dimensions (mutually perpendicular, and both radial and perpendicular to the longitudinal access of the fiber), so that linearity is approximated. While microscopic examination of the fibers may reveal the two other dimensions are small, compared to the principal dimension of the fibers, such other two dimensions need not be substantially equivalent nor constant through the axial length of the fiber. It is only important that the fiber be able to bend by the axis and be able to bond to other fibers.

The fibers may be synthetic, such as polyolefin or polyester; are preferably cellulosic, such as cotton linters, rayon or bagasse; and more preferably are wood pulp, such as softwoods (gymnosperms or coniferous) or hardwoods (angiosperms or deciduous) or comprise layers of the foregoing.

As used herein a tissue laminate 10 is considered "cellulosic" if either lamina 12 or 14 comprises at least about fifty weight percent or at least about fifty volume percent cellulosic fibers, including but not limited to those fibers listed above. A cellulosic mixture of woodpulp fibers comprising softwood fibers having a length of about 2.0 to about 4.5 millimeters, a diameter of about 25 to about 50 micrometers, and hardwood fibers having a length of less than about one millimeter and a diameter of about 12 to about 20 micrometers has been found to work well for the tissue laminae 12 and 14 described herein.

If woodpulp fibers are selected for the tissue laminae 12 and 14, the fibers may be produced by any pulping process including chemical processes, such as sulfite, sulfate and soda processes; and mechanical processes such as stone groundwood. Alternatively, the fibers may be produced by combinations of chemical and mechanical processes or may be recycled. The type, combination and processing of the fibers used in the present invention are not critical to the present invention.

The tissue laminate 10 (including both laminae 12 and 14 and the adhesive 16) may have a basis weight of about 13 to about 28 pounds per 3,000 square feet (21 to 46 grams per square meter). Preferably, the tissue laminate 10 comprises about twenty to about fifty weight percent softwood fibers.

Figure 2:
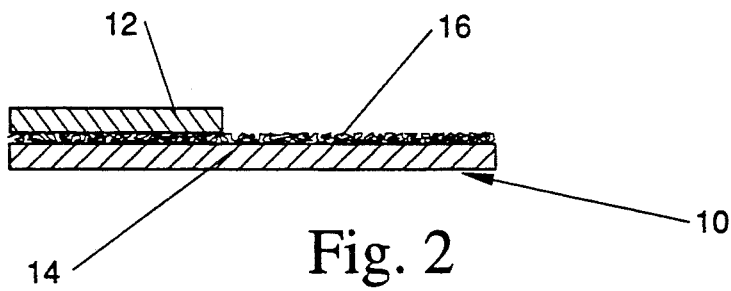
FIG. 2 is a vertical sectional view taken through line II—II of FIG. 1.

The adhesive 16 used in the present invention is water dispersible and is interposed between the cellulosic laminae 12 and 14, as illustrated in FIG. 2. As used herein, an adhesive 16 is considered "water dispersible" if it breaks into smaller constituent components, although not necessarily individual molecules, upon being immersed in ordinary tap or distilled water.

More preferably, the adhesive 16 used in conjunction with the present invention is water soluble. An adhesive 16 is considered "water soluble" if it dissolves into molecular constituents upon being immersed in ordinary tap or distilled water.

An adhesive 16 composition comprising one hundred percent solids is preferable for the present invention, and more particularly a hot melt adhesive 16 has been found to work well with the present invention. Generally, water based adhesives 16 are avoided. Water based adhesives 16 rely upon an aqueous carrier for the adhesive 16 composition. The aqueous carrier is applied to the surface of the laminae 12 and 14 to be joined, then evaporates leaving the adhesive 16 behind. However, introducing water to a tissue lamina 12 or 14, as described herein, can deleteriously relax the crepe of the tissue laminae 12 and 14 or result in de-bonding of the fibers and cause tearing or loss of tensile strength.

The adhesive 16 is preferably a pressure sensitive adhesive 16 so that adhesion occurs upon contact of the two laminae 12 and 14. The adhesive 16 may be applied to one face of a tissue lamina 12 or 14. Preferably, the adhesive 16 is applied to the inwardly oriented face of a lamina 12 or 14. The laminae 12 and 14 are then pressed together so that adhesive 16 bonding occurs.

Furthermore, the adhesive 16 used in conjunction with the present invention should be capable of being extruded through a small orifice and forming a fine filament so that the adhesive 16 can be readily deposited in a desired pattern. It is acceptable that the adhesive 16 is heated in order to properly extrude.

The adhesive 16 may be extruded in any pattern desired and preferably has a filament diameter of about 10 to about 60 microns. Referring again to FIG. 1, the adhesive 16 is applied in a stripe having a width less than about 5 centimeters (1.9 inches), is preferably applied in a stripe having a width less than about 2 centimeters (0.8 inches) and more preferably is about 1 centimeter (0.4 inches) wide.

The stripe formed from the adhesive 16 pattern is longitudinally oriented. As used here, in a stripe is considered "longitudinally oriented" if the principal direction of the stripe is within plus or minus 45 degrees of the machine direction of the tissue product laminate 10 during manufacture. For purposes of comparison, the perforations of toilet tissue and paper toweling are generally transversely oriented and occur at right angles to the longitudinal direction.

The stripe may comprise any desired geometry, such as a serpentine pattern, a sinusoidal pattern, or a straight line pattern. A longitudinally oriented straight line pattern is preferred because it deposits the least amount of adhesive 16 onto the tissue laminae 12 and 14, due to not having a transversely oriented component (other than its width). If a straight line pattern is selected, preferably the centerline of the stripe is within about 2.5 centimeters (one inch) of the centerline of the tissue laminate 10. More preferably, the centerline of the adhesive 16 stripe and the longitudinal centerline of the tissue laminate 10 coincide, so that the stripe of adhesive 16 is generally transversely centered on the tissue laminate 10.

Figure 3:
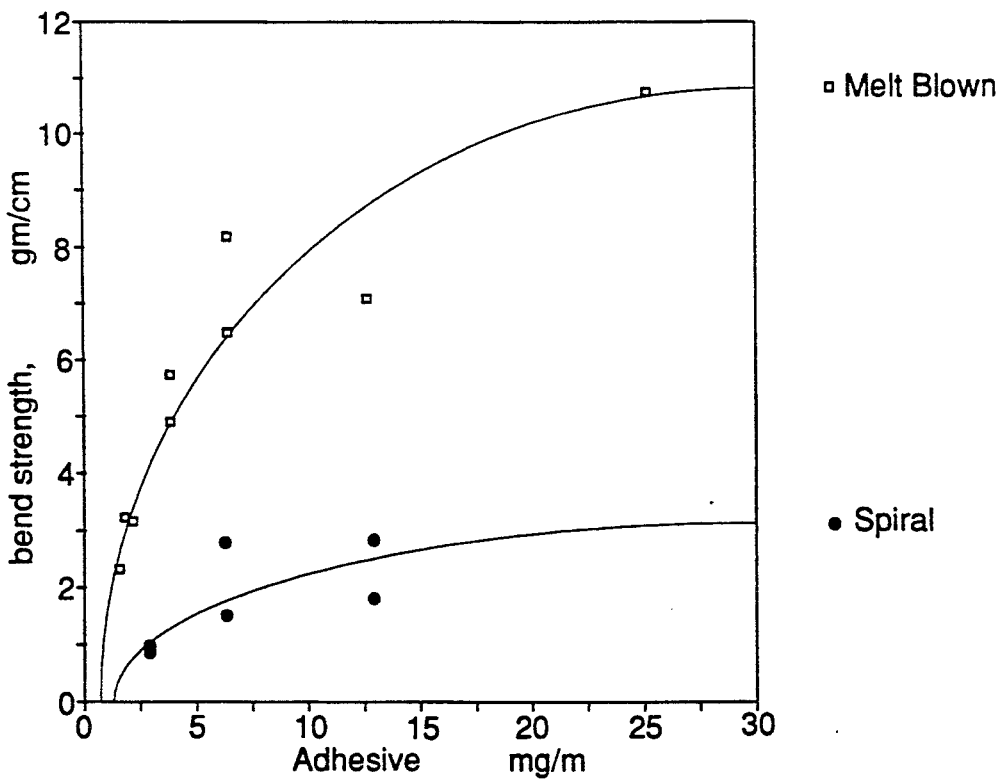
FIG. 3 is a graphical representation of the effect of adhesive quantity on resistance to skinning for two different types of adhesive deposition.

Referring to FIG. 3, preferably, the minimum possible amount of adhesive 16, consistent with the desired bond strength, is utilized, to minimize manufacturing costs, the appearance and presence of adhesive 16 to the consumer, and any deleterious effects the adhesive 16 may have on softness. About 1 to about 4 milligrams of adhesive 16 per linear foot (3.3–13.1 milligrams per linear meter) of tissue laminate 10 has been found suitable for the tissue products described herein. It is preferred that the adhesive 16 be applied as close as possible to the one milligram per lineal foot specification so that the minimum width and quantity of adhesive 16 is utilized, obviating unnecessary losses in softness, consistent with the need for relatively high bonding strength to prevent skinning.

To apply the adhesive 16 to the exposed and inwardly oriented face of one of the tissue laminae 12 or 14, as is known in the art, the lamina 12 or 14 to be adhesive 16 coated is moved past a nozzle from which the adhesive 16 filament is extruded. It is not important whether the nozzle or the lamina 12 or 14 is moved, so long as relative movement of one to the other occurs. It is far more common in the art to hold the nozzle stationery and move the tissue lamina 12 or 14 relative to the nozzle. Such relative movement may be accomplished by winding the tissue laminate 10 onto a roll to be later converted as desired.

Preferably, the adhesive 16 selected for use with the present invention is capable of being applied in a spiral pattern or a melt blown pattern within the stripe. Ethylene vinyl acetate adhesives 16 may be used. Adhesives 16 which have been found to work well are H9065 and H9087 adhesives supplied by the Findley Adhesives Company of Wauwatosa, Wis.

If the water dispersible adhesive 16 is to be deposited onto the lamina 12 or 14 in a spiral pattern, an adhesive 16 filament having a diameter of about 58 microns and a coverage of about 4 milligrams per linear foot (13 milligrams per linear meter) has been found suitable. Due to the lesser coverage of a spiral pattern in the transverse direction than of a melt blown pattern and the limited overlap of the adhesive 16 filament in the transverse direction which typically occurs when spiral pattern is utilized, it is generally necessary that a higher quantity of adhesive 16 be utilized for a spiral pattern than for a melt blown pattern. Thus, it is desired that a relatively larger diameter adhesive 16 filament be utilized when employing the spiral adhesive 16 pattern. If a spiral adhesive 16 pattern is selected, one nozzle which has been found to work well is supplied under part number 057B1645 by the Mercer Corporation of Hendersonville, Tenn.

Another and more preferred method of applying the water dispersible adhesive 16 to the laminae 12 and 14 is to utilize a melt blown adhesive 16 nozzle. The melt blown adhesive 16 nozzle sprays the adhesive 16 in a random pattern of a desired width and provides for relatively more consistent coverage of the adhesive 16 in the transverse direction than does the spiral adhesive 16 nozzle.

If desired, a plurality of melt blown adhesive 16 nozzle orifices arranged in a line having a principal orientation transverse the machine direction may be utilized. It is to be recognized that as more adhesive 16 nozzle orifices are utilized, each may extrude a finer diameter of adhesive 16 filament so that the total adhesive 16 coverage remains relatively constant and the adhesive is less likely to be noticed by the consumer.

For example, as illustrated in Table I, adhesive 16 filament diameters of eleven microns to twenty two microns may be utilized with melt blown adhesive 16 pattern depositions, depending upon the number of adhesive 16 nozzle orifices utilized to deposit the adhesive 16 onto the tissue laminae 12 and 14.

TABLE I

| Number of Nozzle Orifices | Adhesive Filament Diameter In Microns | Coverage in Milligrams Per Linear Foot |
|---|---|---|
| 3 | 22 | 1 |
| 5 | 17 | 1 |
| 7 | 14 | 1 |
| 12 | 11 | 1 |

If a melt blown deposition pattern is utilized, a melt blown adhesive 16 nozzle diehead that has been found to work well is supplied by J & M Laboratories of Gainseville, Ga. under model number AMBI-DT-5x0.125 x 0.020.

Referring again to FIG. 3, it can be seen, as expected, the resistance to skinning and subsequent ply separation increases with the amount of adhesive 16 utilized to join the tissue laminae 12 and 14. FIG. 3 shows the bond strength on the vertical axis and adhesive 16 coverage on the horizontal axis. The bond separation strength was measured by manually separating the two laminae 12 and 14 at a longitudinal edge and attaching the free end of each lamina 12 or 14 to the jaws of a tensile machine. The jaws of the tensile machine were separated at a cross-head speed of about 5.1 centimeters per minute (2.0 inches per minute) in a direction substantially perpendicular to the plane of the tissue laminate 10. The reading (in grams) obtained by the tensile machine is then divided by the width of the tissue laminate 10 to obtain the bond strength.

It can be seen that the melt blown adhesive 16 pattern produces a significantly higher bond strength than does the spiral adhesive 16 pattern. This higher bond strength is believed to occur because the spiral adhesive 16 pattern provides significantly less coverage across the width of the stripe than does the melt blown adhesive 16 pattern. It is believed that the difference in bond strength between the two patterns can be reduced by running the tissue lamina 12 or 14 having adhesive 16 deposited thereon at a relatively slower speed, so that the loops forming the spiral are closer together or, preferably, overlap. However, for most high-speed applications, the melt-blown adhesive 16 pattern is clearly preferred.

By applying a single longitudinally oriented stripe of adhesive 16, the softness of the laminate 10 may not be noticeably diminished relative to the softness of either individual lamina 12 or 14. Thus, the softness of the laminate 10 may be substantially equivalent to the softness of either lamina 12 or 14 prior to joining. "Softness" is a pleasing tactile sensation which occurs upon epidermal contact with the surface of the tissue laminate 10 or laminae 12 or 14. Softness may be measured according to the PSU data method disclosed in U.S. Pat. No. 4,300,981 issued Nov. 17, 1981 to Carstens, which patent is incorporated herein by reference for the purpose of illustrating a method to judge the softness of the laminate 10 after various patterns of adhesive 16 have been used to join the laminae 12 and 14.

If desired, the laminae 12 and 14 may be joined by a plurality of adhesive 16 stripes, which stripes are preferably longitudinally oriented. However, utilizing more than one stripe of adhesive 16 will likely cause a significant loss of softness in the laminate 10 relative to the softness of either lamina 12 or 14 prior to joining. The parameters controlling the softness upon joining of the laminae 12 and 14 include, in descending order: the number of stripes of adhesive 16 used to join the laminae 12 and 14 (with fewer, preferably one, stripe being preferred); the width of the stripes (with stripes of lesser width being preferred); and the milligrams of adhesive 16 utilized per linear foot (meter) of laminate 10 (with lesser coverage being preferred).

After the adhesive 16 is deposited onto one of the laminae 12 or 14, the other lamina 12 or 14 is brought in face-to-face contact with the first lamina 12 or 14 and the adhesive 16, so that the adhesive 16 is interposed between the inwardly oriented faces of the two laminae 12 and 14. The laminae 12 and 14 and adhesive 16 may then be passed through a nip, so that a pressure is applied orthogonal the plane of the tissue laminae 12 and 14 and the pressure sensitive adhesive 16 firmly contacts the inwardly oriented face of the lamina 12 or 14 to which the stripe of adhesive 16 was not applied. A nip formed by two steel rolls loaded to about 6.25 kilograms per centimeter (35 pounds per inch) has been found to work well.

After the laminae 12 and 14 pass through the nip and form a unitary laminate 10 with the interposed adhesive 16, the laminate 10 may be wound onto a roll using a winding stand as is commonly known in the art, and subsequently stored as desired. Alternatively, the tissue laminae 12 and 14 and adhesive 16 laminate 10 may be sent directly to a converting operation. It is not necessary that the adhesive 16 be allowed any significant cure time, as the adhesive 16 suggested herein sets and develops adhesion very quickly after cooling to room temperature.

While it is understood that several variations and patterns of stripes and of adhesive 16 filaments within the stripes are possible, and that different types of adhesive 16 and cellulosic laminae 12 and 14 may be used in combination, all such variations and permutations fall within the scope of the claimed invention. For example, it is possible that the two laminae 12 and 14 be of different compositions, different thicknesses, and even (but preferably not) of different widths may be utilized in accordance with the present invention or that stripes having different patterns (lines, sinusoidal, melt blown and spiral). All such variations and permutations are within the scope of the claimed invention.

What is claimed is:

1. A laminate of two tissue laminae adhesively joined by hot melt adhesive forming a pattern comprising a single longitudinally oriented strip having a width less than about 5 centimeters.

2. A tissue laminate according to claim 1 wherein said laminate has a softness substantially equivalent to the softness of either lamina prior to joining.

3. A tissue laminate according to claim 1 wherein said hot melt adhesive forms a pattern comprising a longitudinally oriented stripe having a width less than about 2 centimeters.

4. A tissue laminate according to claim 3 wherein said adhesive is melt blown.

5. A tissue laminate according to claim 4 comprising less than about 13 milligrams of adhesive per linear meter of laminate.

6. A tissue lamina according to claim 1 wherein said stripe is generally transversely centered on said laminate.

7. A laminate of two tissue laminae adhesively joined by at least one stripe of hot melt adhesive which is substantially parallel the machine direction of said laminate and has a width less than about 5 centimeters.

8. A tissue laminate according to claim 7 wherein said hot melt adhesive forms a pattern comprising a longitudinally oriented strip having a width less than about 2 centimeters.

9. A tissue laminate according to claim 8 wherein said stripe is generally transversely centered on said laminate.

10. A tissue laminate according to claim 7 wherein said adhesive is melt blown.

* * * * *

UNITED STATES PATENT AND TRADEMARK OFFICE
CERTIFICATE OF CORRECTION

PATENT NO. : 5,143,776
DATED : September 1, 1992
INVENTOR(S) : Edward J. Givens

It is certified that error appears in the above-identified patent and that said Letters Patent is hereby corrected as shown below:

Abstract, Line 6  "deposited either ina spiral pattern" should read ---deposited either in a spiral pattern---.

Column 2, line 32  "Adhesive Joining" should read ---Adhesive joining---.

Column 3, line 8  "adhesively Joined" should read ---adhesively joined---.

Signed and Sealed this

First Day of June, 1993

Attest:

MICHAEL K. KIRK

*Attesting Officer*  Acting Commissioner of Patents and Trademarks